US009914468B2

(12) United States Patent
Coules et al.

(10) Patent No.: US 9,914,468 B2
(45) Date of Patent: Mar. 13, 2018

(54) COLLAPSIBLE CART

(71) Applicants: Donna Coules, Bellmore, NY (US);
Alex Coules, Bellmore, NY (US)

(72) Inventors: Donna Coules, Bellmore, NY (US);
Alex Coules, Bellmore, NY (US)

( * ) Notice: Subject to any disclaimer, the term of this patent is extended or adjusted under 35 U.S.C. 154(b) by 0 days.

(21) Appl. No.: 15/403,493

(22) Filed: Jan. 11, 2017

(65) Prior Publication Data
US 2017/0197649 A1 Jul. 13, 2017

Related U.S. Application Data

(60) Provisional application No. 62/277,619, filed on Jan. 12, 2016.

(51) Int. Cl.
| B26B 3/02 | (2006.01) |
| B62B 3/02 | (2006.01) |
| B62B 5/06 | (2006.01) |
| B62B 3/04 | (2006.01) |
| B62B 3/12 | (2006.01) |

(52) U.S. Cl.
CPC .............. B62B 3/027 (2013.01); B62B 3/04 (2013.01); B62B 3/12 (2013.01); B62B 5/066 (2013.01); *B62B 2501/065* (2013.01)

(58) Field of Classification Search
CPC ......... B62B 1/266; B62B 1/047; B62B 3/027; B62B 3/106
See application file for complete search history.

(56) References Cited

U.S. PATENT DOCUMENTS

| 2,733,930 | A | * | 2/1956 | Putterman | B62B 3/106 |
| | | | | | 280/47.34 |
| 2,757,935 | A | * | 8/1956 | Sofia | B62B 1/125 |
| | | | | | 280/47.26 |
| 2,872,202 | A | * | 2/1959 | Tripoli | B62B 1/12 |
| | | | | | 280/654 |
| 4,160,557 | A | * | 7/1979 | Taylor | B62B 3/106 |
| | | | | | 248/98 |
| 4,185,848 | A | | 1/1980 | Holtz | |
| 4,765,646 | A | | 8/1988 | Cheng | |
| 4,826,187 | A | * | 5/1989 | Abbott | B62B 1/12 |
| | | | | | 248/98 |
| 5,232,274 | A | * | 8/1993 | Johan | B62B 3/106 |
| | | | | | 248/101 |
| 5,456,431 | A | * | 10/1995 | Ilnisky | B62B 3/02 |
| | | | | | 248/150 |
| 6,328,329 | B1 | | 12/2001 | Smith | |
| 6,866,289 | B2 | | 3/2005 | Prather | |
| 7,004,482 | B1 | * | 2/2006 | Steffan | A63B 55/00 |
| | | | | | 280/47.17 |

(Continued)

*Primary Examiner* — Katy M Ebner
(74) *Attorney, Agent, or Firm* — Global Intellectual Property Agency, LLC; Daniel Enea

(57) ABSTRACT

A collapsible cart. The collapsible cart includes a frame with a first end and a second end, and the frame secures to a bracket and a base. The collapsible cart further includes a basket that can hold large and small items, and wheels located on the underside of the base provide for easy movement of the cart. A handle, the bracket, and the base are each affixed to the frame via a pivot and can fold towards the frame forming a collapsed configuration. In this way, the collapsible cart can be easily transported and deployed at various locations typically inaccessible to vehicles.

12 Claims, 3 Drawing Sheets

(56) References Cited

U.S. PATENT DOCUMENTS

| | | | |
|---|---|---|---|
| 7,252,302 B1* | 8/2007 | Thurn | B62B 3/027 280/47.34 |
| 7,566,069 B1* | 7/2009 | Ortega | B62B 3/027 280/32.6 |
| 8,408,581 B1 | 4/2013 | Hunter | |
| 9,050,988 B1* | 6/2015 | McLeod | B62B 3/022 |
| 2003/0197339 A1* | 10/2003 | D'Angelo | A45B 11/00 280/33.991 |
| 2004/0001748 A1* | 1/2004 | Landefeld | B62B 1/125 414/490 |
| 2004/0100070 A1* | 5/2004 | Bekkers | B62B 1/045 280/645 |
| 2004/0108670 A1* | 6/2004 | Hendzel | B62B 3/106 280/47.35 |
| 2004/0113381 A1* | 6/2004 | Bergia | B62B 3/02 280/47.26 |
| 2004/0140649 A1* | 7/2004 | Faden | B62B 3/106 280/651 |
| 2005/0023781 A1* | 2/2005 | Ortega | B62B 1/125 280/47.24 |
| 2005/0103950 A1* | 5/2005 | Joubert | B62B 1/12 248/98 |
| 2005/0161915 A1* | 7/2005 | Landefeld | B62B 1/125 280/654 |
| 2006/0071436 A1* | 4/2006 | O'Connor | A45C 5/143 280/47.29 |
| 2006/0145437 A1* | 7/2006 | Odgers | B62B 1/042 280/47.19 |
| 2007/0090616 A1* | 4/2007 | Tompkins | B62B 1/266 280/47.28 |
| 2007/0096437 A1* | 5/2007 | Watson | B62B 3/027 280/651 |
| 2008/0296855 A1* | 12/2008 | Roseman | B62B 3/027 280/33.993 |
| 2008/0309038 A1* | 12/2008 | Gilligan | B62B 1/14 280/47.24 |
| 2009/0026734 A1* | 1/2009 | Holzman | B62B 1/125 280/652 |
| 2009/0152825 A1* | 6/2009 | Adams | B62B 1/14 280/47.31 |
| 2009/0224495 A1* | 9/2009 | Anderson | B62B 3/027 280/47.26 |
| 2009/0283990 A1 | 11/2009 | Graham | |
| 2010/0237576 A1* | 9/2010 | MacCario | B62B 1/266 280/47.26 |
| 2012/0261907 A1* | 10/2012 | White | B62B 5/067 280/651 |
| 2013/0313377 A1* | 11/2013 | Struck, II | B65F 1/10 248/98 |
| 2014/0035262 A1* | 2/2014 | White | B62B 5/067 280/651 |
| 2014/0183844 A1* | 7/2014 | Iryami | B62B 3/027 280/659 |
| 2014/0232076 A1* | 8/2014 | Day | B62B 1/125 280/37 |
| 2014/0265190 A1* | 9/2014 | Beaver | B62B 3/10 280/47.19 |
| 2015/0175185 A1* | 6/2015 | Thorpe | B62B 5/0016 280/491.1 |
| 2015/0208780 A1* | 7/2015 | Avery | A45C 13/385 280/652 |
| 2016/0207556 A1* | 7/2016 | Unrath | B62B 3/027 |

* cited by examiner

COLLAPSIBLE CART

CROSS REFERENCE TO RELATED APPLICATION

This application claims the benefit of U.S. Provisional Application No. 62/277,619 filed on Jan. 12, 2016. The above identified patent application is herein incorporated by reference in its entirety to provide continuity of disclosure.

BACKGROUND OF THE INVENTION

Field of the Invention

The present invention relates to carts. More specifically, the present invention provides a collapsible cart that can be transported in a vehicle to a location, such as a mall, shopping center, grocery store, and the like, deployed to rollably carry objects and items, and collapsed into an optimum minimum size for storage during periods of non-use.

Malls, shopping centers, and grocery stores rarely offer carts for transporting recent purchases from between stores, or from stores to vehicles. Typically, customers must hand-carry their purchases in bags and purses. Even after a short duration, individuals may become fatigued or cause injury to their hands and arms. In addition, elderly, arthritic, and physically disabled individuals may have an extremely difficult time carrying objects in bags for any length of time.

Devices have been disclosed in the known art that relate to carts. However, these devices have several drawbacks. For example, some of these devices provide basket shopping carts providing compartments for storing packages and are readably foldable. Although these devices may be foldable, the construction and configuration are not particularly sturdy and easily deployable and collapsible.

In light of the devices disclosed in the known art, it is submitted that the present invention substantially diverges in design elements from the known art and consequently it is clear that there is a need in the art for an improvement to existing cart devices. In this regard the instant invention substantially fulfills these needs.

SUMMARY OF THE INVENTION

In view of the foregoing disadvantages inherent in the known types of carts now present in the prior art, the present invention provides a new collapsible cart wherein the same can be utilized for providing convenience for the user when transporting items from location to location.

It is therefore an object of the present invention to provide a new and improved collapsible cart comprising a frame with a handle and a collapsible basket that secures to a bracket and a base. The basket can hold large and small items therein, and wheels disposed on the underside of the base provide for easy movement. The handle, bracket, and base are each pivotally affixed to the frame and can fold towards the frame, forming a collapsed configuration. In this way, the collapsible cart can be easily transported and deployed at various locations typically inaccessible to vehicles.

It is another object of the present invention to provide a collapsible cart that collapses into an optimum minimum size for storage during periods of nonuse.

Another object of the present invention is to provide a collapsible cart with a basket that extend and retracts as the height of the frame is adjusted and the contents of the basket increase.

It is another object of the present invention to provide a collapsible cart with a handle having a ring structure for gripping, and one or more recesses for receiving cups and the like therein.

Another object of the present invention is to provide a collapsible cart that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
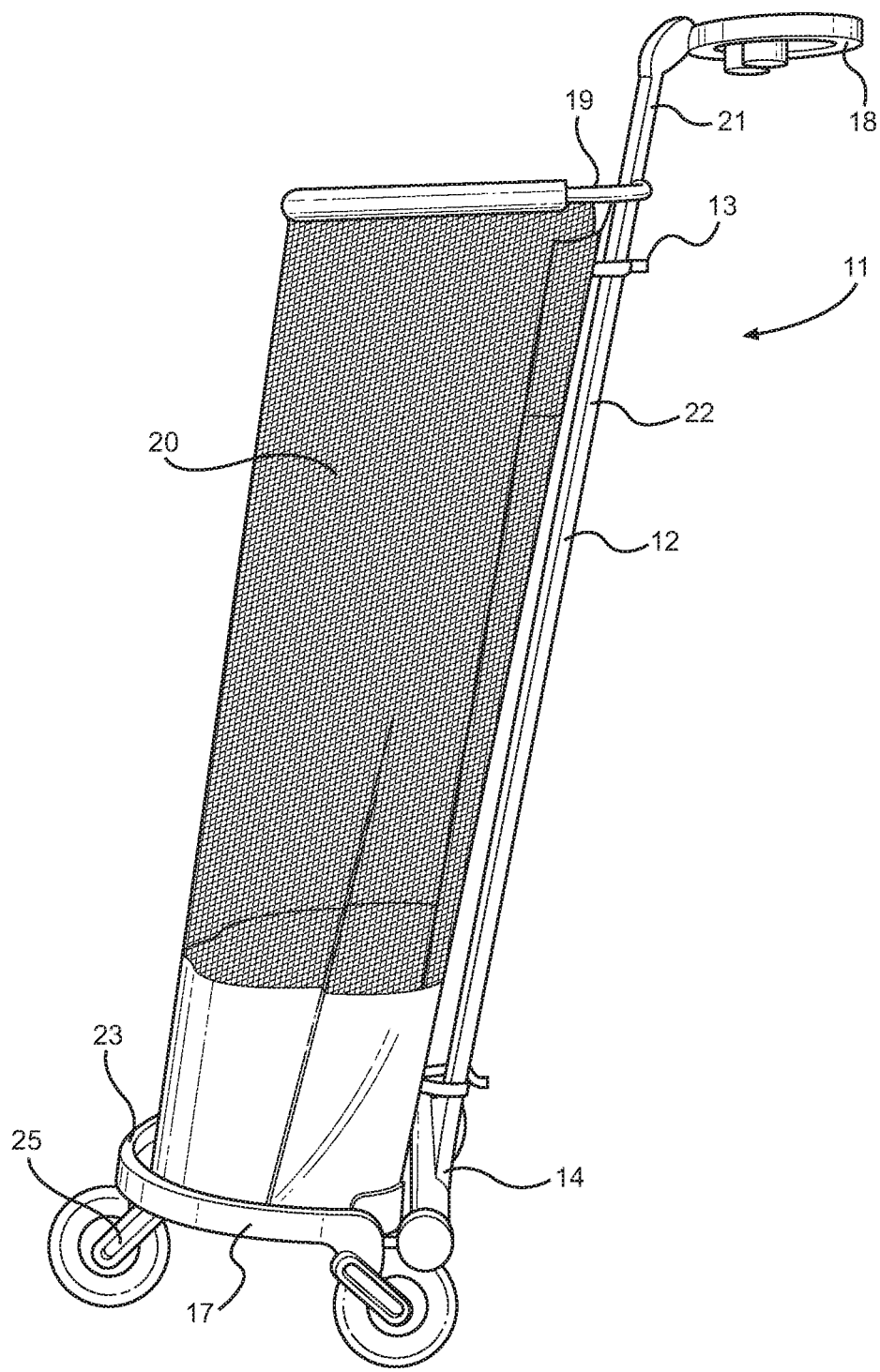
FIG. 1 shows a perspective view of the cart in a working configuration.

Reference is made herein to the attached drawings. Like reference numerals are used throughout the drawings to depict like or similar elements of the cart. For the purposes of presenting a brief and clear description of the present invention, the preferred embodiment will be discussed as used for wheeled carrying and transporting items. The figures are intended for representative purposes only and should not be considered to be limiting in any respect.

Referring to FIG. 1, there is shown a perspective view of the cart in a working configuration. The cart 11 comprises a frame 12 having a first end 13 and an opposing second end 14. A handle 18 is pivotally affixed to the first end 13 and extends outwardly from a second side 35 of the frame 12. The handle 18 provides a gripping surface that allows for manual manipulation and movement of the cart 11. A base 17 is pivotally affixed to a second end 14 and extends outwardly from a first side of the frame 12. In the shown embodiment, the first side of the frame is opposing the second side 35 of the frame 12.

In the shown embodiment, the base 17 is a semi-circular, planar member that is pivotally affixed to the frame 12 along a diameter thereof. A bracket 19 is pivotally affixed to the first end 13 and extends outwardly from the first side. The bracket 19 is configured to removably secure a basket 20 to the cart 11. The basket 20 is removably securable to the base 17 and the bracket 18 via fasteners. In addition, the basket 20 is securable along the frame 12 via fasteners. The basket 20 is preferably collapsible and composed of an elastic mesh that is configured to linearly and laterally stretch.

In the shown embodiment, the frame 12 is a tubular member in a generally upright position. The frame 12 is in a telescopic arrangement, such that a first section 21 is in sliding engagement with a second section 22, that provides for relative adjustment of the handle 18 relative to the basket 20 and the base 17.

The base 17 further comprises one or more wheels 25 adapted to rollably engage with a floor surface for movement of the cart 11. A lip 23 is preferably disposed along a perimeter of the base 17, wherein the lip 23 protrudes perpendicular from the base 17 and prevents objects supported on the base 17 from sliding off. In one embodiment, the wheels 25 are pivotally affixed to the base 17, thereby allowing the angle of each wheel to independently and freely rotate. In the shown embodiment, the wheels 25 are in a triangular configuration with a single leading wheel and two adjacent wheels disposed towards the frame 12.

Figure 2:
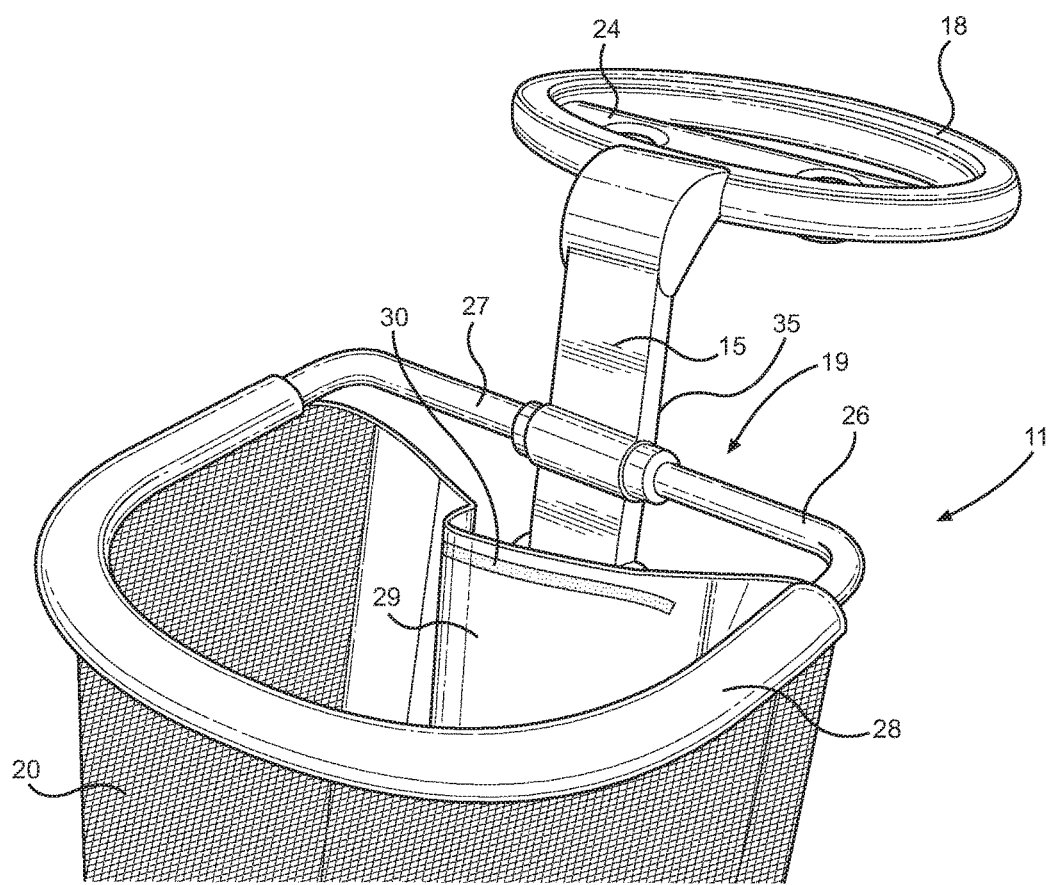
FIG. 2 shows a close-up view of the first end of the cart in a working configuration.

Referring to FIG. 2, there is shown a close-up view of the first end of the cart in a working configuration. In the shown embodiment, the bracket 19 of the cart 11 includes a first arm 26 and a second arm 27, each configured to engage with an arm receiving channel 28 of the basket 20. The arms 26. 27 extend laterally from the first side 15 of the frame, and then curve away from the first side 15. The channel 28 of the basket 20 is curved and corresponds to the shape of the arms 26, 27 to allow for securement therewith by sliding the arms 26,27 into opposing ends of the channel 28. In the shown embodiment, when the basket 20 is secured to the bracket 19, an open end of the basket 20 is formed that allows for the receiving of items and objects therein. The basket 20 further includes a pocket 29 disposed on the interior thereof. The pocket 29 is configured to hold smaller objects, and a zipper fastener 30 controls access thereto.

In the shown embodiment, the handle 18 includes a ring structure that is pivotally affixed to the second side of the frame. The handle 18 further comprises one or more recesses 24 adapted to receive cups, keys, and the like.

Figure 3:
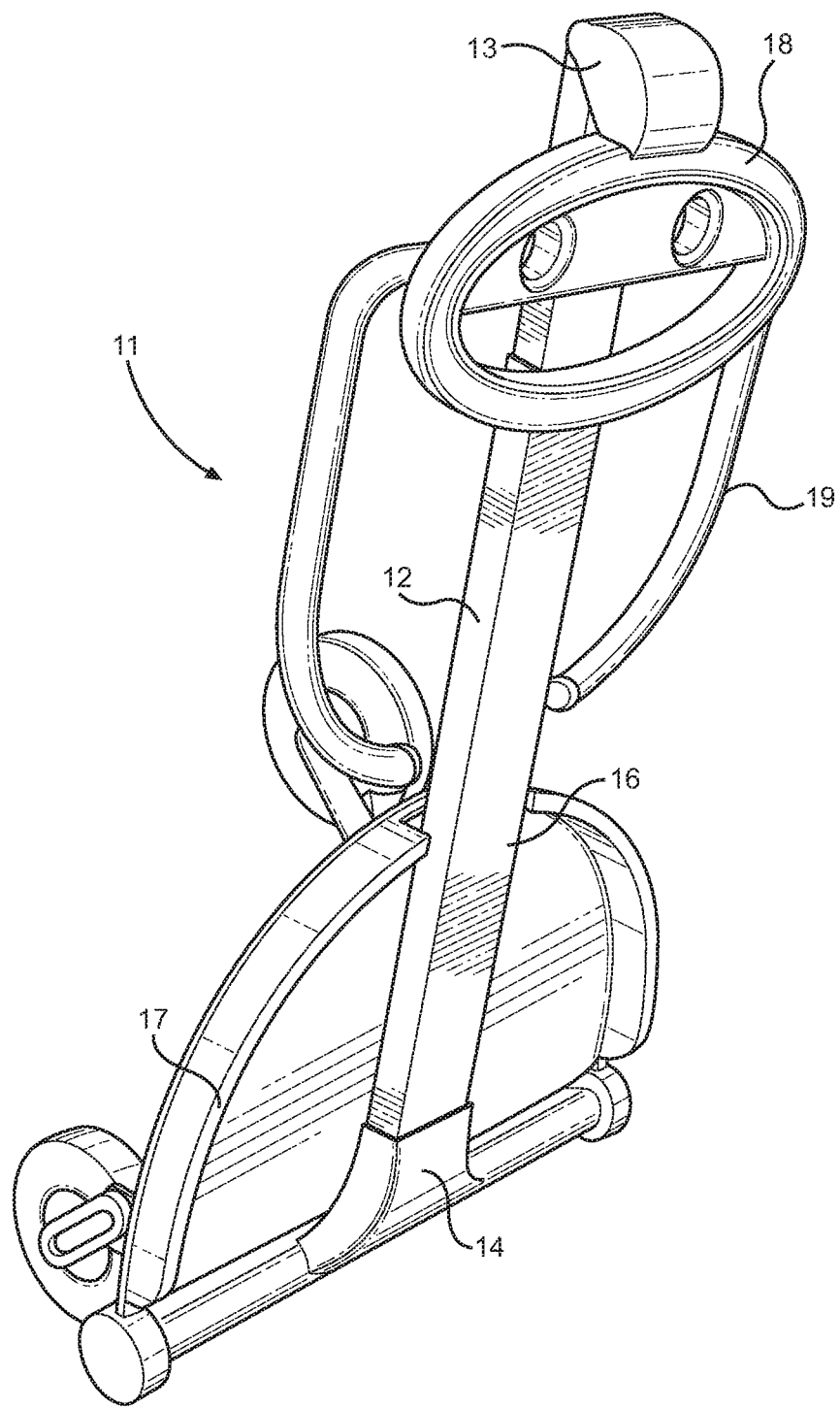
FIG. 3 shows a perspective view of the cart in a collapsed configuration.

Referring to FIG. 3, there is shown a perspective view of the cart in a collapsed configuration. In the shown embodiment, the cart 11 is collapsed and can be easily transported and stored. In the collapsed configuration, the basket is removed from the cart, and the base 17 pivots at the second end 14 towards the frame 12. Additionally, the bracket 19 pivots at the first end 13 towards the frame 12, and the handle 18 pivots at the first end 13 towards the frame 12. In this way, each of the components of the cart can be folded in toward one another so that the cart maintains a collapsed configuration having a smaller footprint than the cart in a working configuration.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A collapsible cart, comprising:
    a frame including a first end, a second end, a first side, and a second side;
    a base pivotally affixed to the second end and extending outward from the first side;
    a handle pivotally affixed to the first end and extending outward from the second side;
    a bracket pivotally affixed to the first end and extending outward from the first side;
    a basket removably securable to the base and the bracket;
    wherein the basket comprises a continuous curved channel having a first opening and a second opening, the first opening configured to receive a first arm of the bracket therein, and the second opening configured to receive a second arm of the bracket therein.

2. The collapsible cart of claim 1, wherein:
    the frame includes a first section slidably engageable to a second section in a telescopic arrangement, wherein a height of the bracket and a height of the handle are adjustable.

3. The collapsible cart of claim 1, wherein:
    the base comprises a lip disposed around a periphery thereof.

4. The collapsible cart of claim 3, wherein the lip further comprises a cutout configured to receive the frame therein.

5. The collapsible cart of claim 1, wherein the basket is composed of a collapsible, elastic mesh.

6. The collapsible cart of claim 1, wherein:
    the handle includes one or more recesses configured to receive objects therein.

7. The collapsible cart of claim 6, wherein the handle comprises a ring structure, the ring structure having a plate extending between opposing sides thereof, the plate further comprising one or more recesses configured to receive objects therein.

8. The collapsible cart of claim 1, wherein bracket comprises a first arm and a second arm, wherein the first arm and the second arm are each pivotally affixed to the frame.

9. The collapsible cart of claim 1, wherein:
    the base includes one or more wheels configured to engage with a floor surface;
    the one or more wheels are configured to independently rotate with respect to the base.

10. The collapsible cart of claim 1, wherein the cart is configurable into a collapsed position, wherein the base pivots at the second end towards the frame, the bracket pivots at the first end towards the frame, and the handle pivots at the first end towards the frame when the cart is in a collapsed configuration.

11. The collapsible cart of claim 10, wherein each of the base, the bracket, and the handle pivot independently of each other.

12. The collapsible cart of claim 1, wherein the basket includes a pocket having a closure for securing items therein.

* * * * *